United States Patent
Davis et al.

(10) Patent No.: US 9,967,735 B2
(45) Date of Patent: May 8, 2018

(54) METHOD AND SYSTEM FOR CONTROLLING WIRELESS ACCESS OR AUTHORIZED FEATURES OF A MOBILE TRANSCEIVER

(71) Applicant: DEERE & COMPANY, Moline, IL (US)

(72) Inventors: Travis J Davis, Polk City, IA (US); Zachary E Beese, Ames, IA (US)

(73) Assignee: DEERE & COMPANY, Moline, IL (US)

( * ) Notice: Subject to any disclaimer, the term of this patent is extended or adjusted under 35 U.S.C. 154(b) by 614 days.

(21) Appl. No.: 14/163,427

(22) Filed: Jan. 24, 2014

(65) Prior Publication Data
US 2015/0215844 A1    Jul. 30, 2015

(51) Int. Cl.
| | |
|---|---|
| *H04W 8/12* | (2009.01) |
| *H04W 8/06* | (2009.01) |
| *H04W 8/18* | (2009.01) |
| *H04W 48/18* | (2009.01) |
| *H04W 84/04* | (2009.01) |
| *H04W 80/00* | (2009.01) |
| *H04W 8/08* | (2009.01) |

(52) U.S. Cl.
CPC .............. *H04W 8/12* (2013.01); *H04W 8/06* (2013.01); *H04W 8/183* (2013.01); *H04W 8/082* (2013.01); *H04W 48/18* (2013.01); *H04W 80/00* (2013.01); *H04W 84/042* (2013.01)

(58) Field of Classification Search
CPC .... H04W 48/18; H04W 60/00; H04W 84/042
USPC ..................... 455/432.1, 432.3, 435.1, 435.2
See application file for complete search history.

(56) References Cited

U.S. PATENT DOCUMENTS

| | | | |
|---|---|---|---|
| 7,167,707 B1 | 1/2007 | Gazzard et al. | |
| 7,447,502 B2 | 11/2008 | Buckley et al. | |
| 8,406,741 B2 | 3/2013 | Kang et al. | |
| 2008/0228901 A1* | 9/2008 | Choi ................... | H04L 41/0803 709/220 |
| 2011/0195700 A1 | 8/2011 | Kukuchka et al. | |

(Continued)

FOREIGN PATENT DOCUMENTS

| | | |
|---|---|---|
| CN | 102118736 A | 7/2011 |
| EP | 1971163 A2 | 9/2008 |

OTHER PUBLICATIONS

European Search Report issued in counterpart application No. 15151491.6, dated Jul. 2, 2015 (8 pages).

(Continued)

*Primary Examiner* — Vladimir Magloire
*Assistant Examiner* — Jaime Holliday

(57) ABSTRACT

Within a mobile station data message, the mobile transceiver reads an observed country code of a visited wireless network to determine a country of operation of the mobile transceiver. The mobile transceiver determines if the observed country code is equal to a stored country code in a subscriber identity module of the mobile transceiver. If the observed country code differs from the stored country code, the mobile transceiver transmits an inquiry data message to a central server via the wireless network to inquire as to whether or not the mobile transceiver is authorized to operate within the observed country. In response to the inquiry, the mobile transceiver may receive mobile profile data related to wireless access or authorized features of the mobile transceiver.

20 Claims, 14 Drawing Sheets

(56) References Cited

U.S. PATENT DOCUMENTS

| | | | | |
|---|---|---|---|---|
| 2012/0129513 A1* | 5/2012 | van der Laak | ....... | H04W 4/001 455/419 |
| 2012/0149356 A1* | 6/2012 | Arun | ................. | H04M 1/6075 455/419 |
| 2012/0282924 A1* | 11/2012 | Tagg | ...................... | H04W 8/04 455/432.1 |
| 2013/0017830 A1* | 1/2013 | Barkley | .............. | H04L 63/0428 455/435.1 |
| 2013/0295998 A1* | 11/2013 | Zheng | .................. | H04W 8/183 455/558 |
| 2014/0051422 A1* | 2/2014 | Mittal | .................. | H04W 12/04 455/419 |

OTHER PUBLICATIONS

O. Erdogan, et al., "A Single Chip Quad-Band GSM/CPRS Transceiver in 0.18μm Standard CMOS," Proc. IEEE International Solid-State Circuits Cont. ISSCC'2005, pp. 318-319, Feb. 2005. [online] http://ieeexplore.ieee.org/xpl/freeabs_all.jsp?arnumber=1493997.
Oliphant, Malcolm. Radio Interfaces Make the Difference in 3g Cellular Systems. [online] Oct. 2, 2000. http://spectrum.ieee.org/telecom/wireless/radio-interfaces-make-the-difference-in-3g-cellular-systems [Retrieved on Feb. 10, 2014].

\* cited by examiner

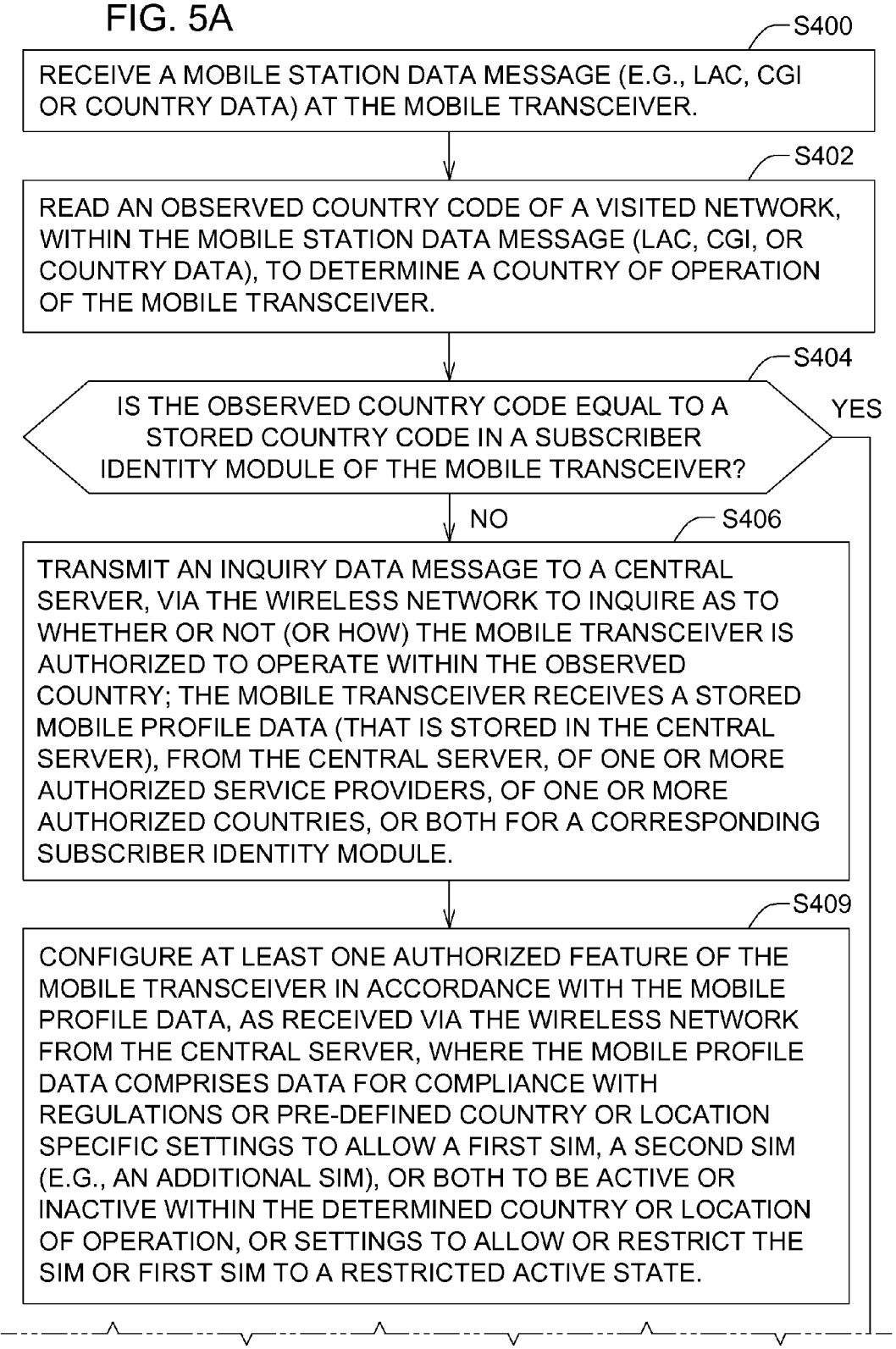

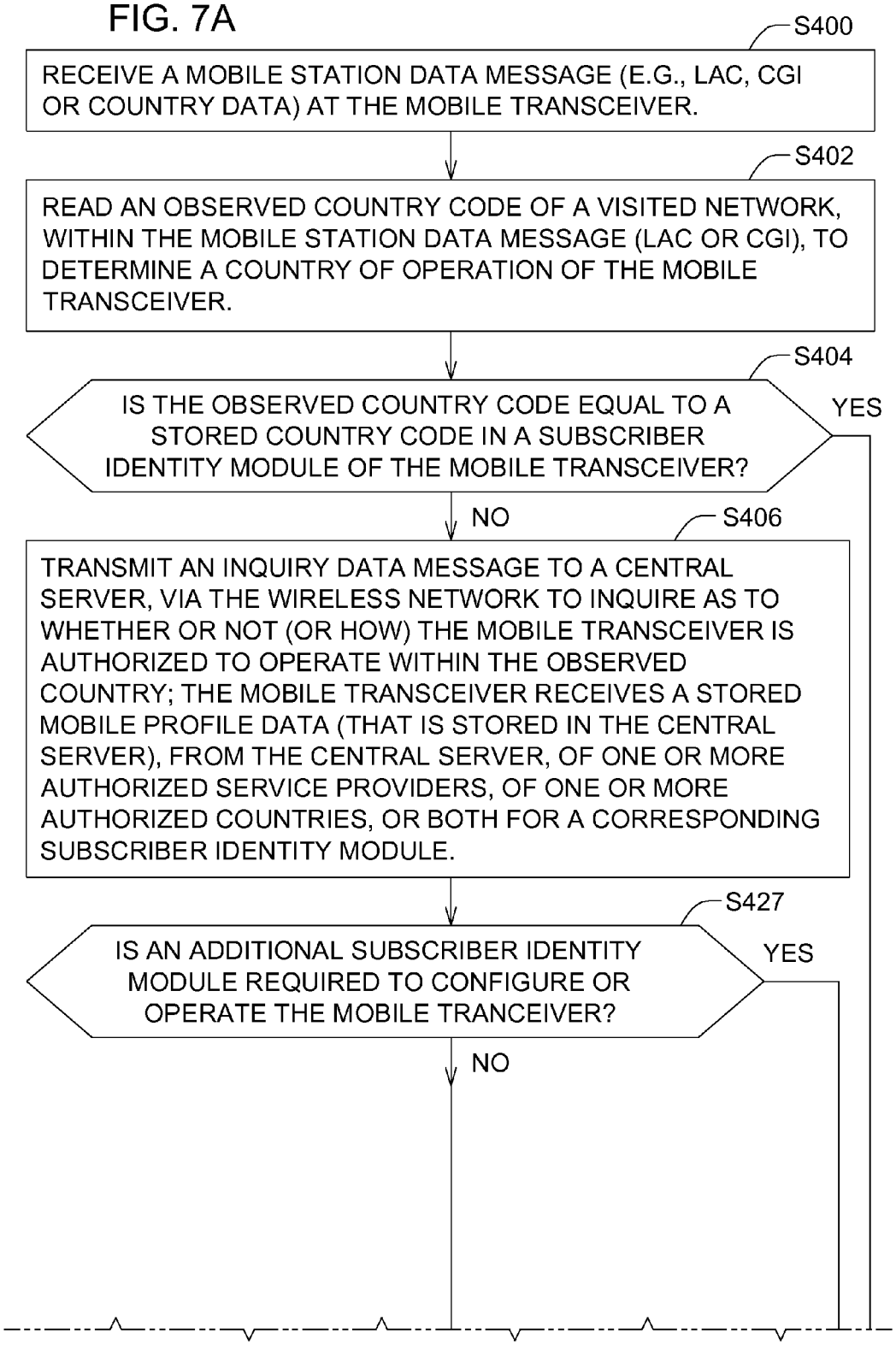

METHOD AND SYSTEM FOR CONTROLLING WIRELESS ACCESS OR AUTHORIZED FEATURES OF A MOBILE TRANSCEIVER

FIELD

This disclosure relates to a method and system for controlling wireless access or authorized features of a mobile transceiver.

BACKGROUND

For a user of a mobile transceiver, a visited network (e.g., in a foreign country) may be motherland) of the mobile transceiver. In certain geographic areas, a mobile transceiver may have limited authorization (e.g., for a limited duration) or no authorization to operate in a roaming mode on the visited network via a first subscriber identity module. Accordingly, there is a need for the mobile transceiver to support an efficient transition from the first subscriber identity module to a second subscriber identity module, or to operate in accordance with applicable authorizations, regulations, or both.

SUMMARY

In accordance with one embodiment, a method or system for controlling access of a mobile transceiver to a wireless network comprises a mobile transceiver for receiving a mobile station data message (e.g. Location Area Code (LAC) or country information). Within the mobile station data message, the mobile transceiver reads an observed country code of a visited wireless network to determine a country of operation of the mobile transceiver. The mobile transceiver determines if the observed country code is equal to a stored country code in a subscriber identity module (e.g., first subscriber identity module) of the mobile transceiver. If the observed country code differs from the stored country code, the mobile transceiver transmits an inquiry data message to a central server (e.g., accessible via the Internet) via the wireless network to inquire as to whether or not the mobile transceiver is authorized to operate within the observed country (e.g., via the subscriber identity module). In response to the inquiry, the mobile transceiver may receive (e.g., from the central server via the wireless network) mobile profile data. The mobile profile data may include one or more of the following data items: one or more of the authorized service providers, one or more authorized countries, one or more other mobile transceiver settings, or an authorized feature for the subscriber identity module and the mobile transceiver. If the observed country code equals the stored country code, the mobile transceiver uses or accesses the visited wireless network without transmitting the inquiry data message to the central server.

BRIEF DESCRIPTION OF THE DRAWINGS

FIG. 2 shows illustrative wireless networks in greater detail than FIG. 1.

DESCRIPTION OF PREFERRED EMBODIMENT(S)

Figure 1:
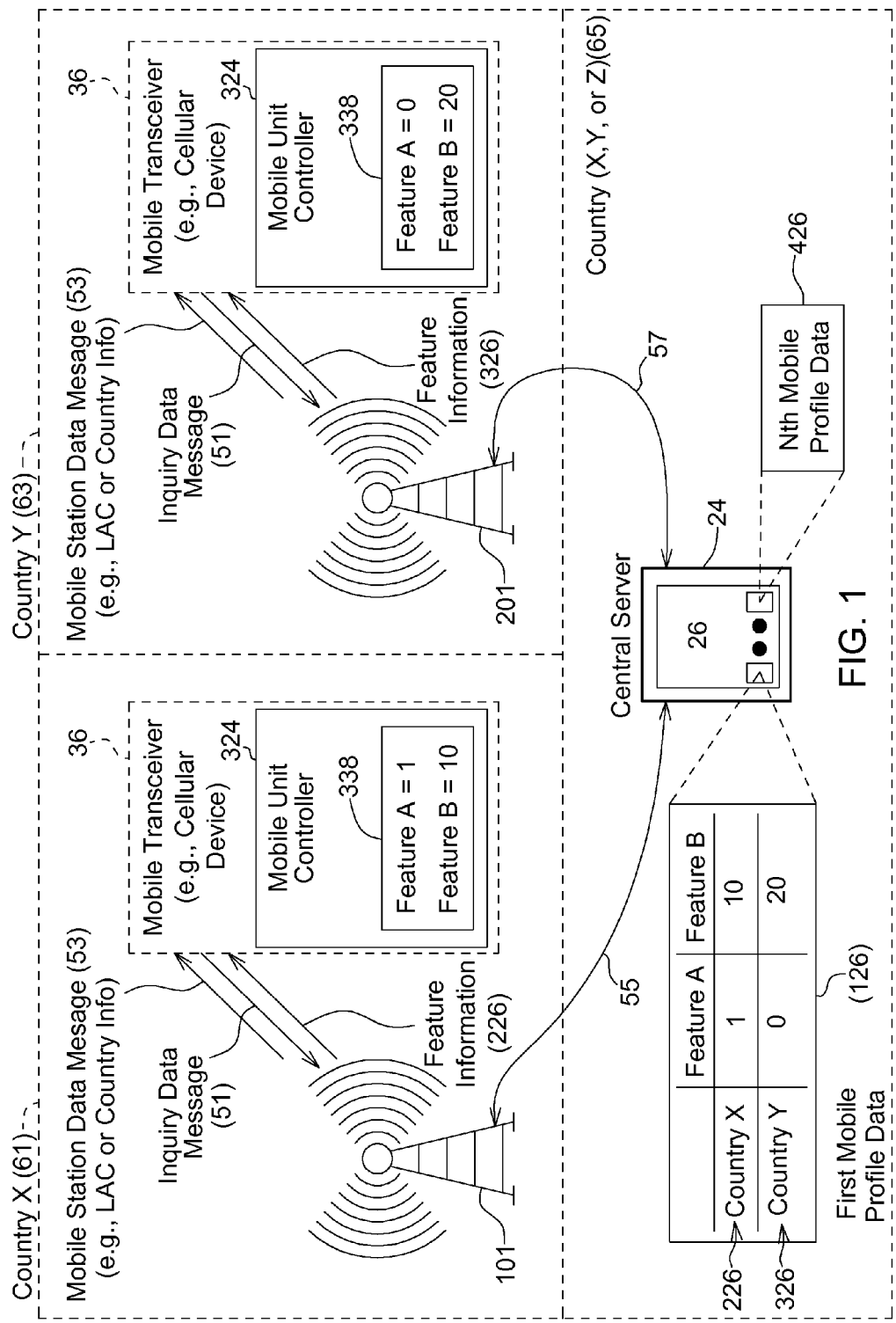
FIG. 1 is a block diagram of an embodiment of a system for controlling wireless access to one or more wireless networks or authorized features of a mobile transceiver on one or more wireless networks.

In accordance with one embodiment, FIG. 1 illustrates a block diagram of a system for controlling access of a mobile transceiver 36 to a wireless network (101 or 201). A mobile transceiver 36 can operate over or communicate via a first wireless network 101, a second wireless network 201, or both, contingent upon proper authorization of the carrier or service provider. The mobile transceiver 36 can send or receive, separately or simultaneously, wireless electromagnetic signals (e.g., a radio frequency or microwave signal) modulated with one or more data messages between the mobile transceiver 36 and the first wireless network 101, the second wireless network 201, or both. In one embodiment, the mobile transceiver 36 is mounted on a vehicle and may communicate diagnostic data, software updates, or other vehicular data between the mobile transceiver 36 and a central server 24. For example, the vehicular data may be generated by a vehicle controller 93, a vehicle sensor 95, or an operator at the user interface or display 97.

The first wireless network 101 may comprise a GSM (Global System for Mobile Communications), TDMA (Time-Division, Multiple-Access), CDMA (Code-Division, Multiple-Access) or other wireless communication system. Similarly, the second wireless network 201 may comprise a GSM, TDMA, CDMA or other wireless communication system.

The central server 24 may store, retrieve, modify, manage and process a mobile data profile 26 for each mobile transceiver 36 or a set of mobile transceivers 36. As shown, the mobile data profile 26 may comprise a first mobile data profile 126 through an Nth mobile data profile 426, where N is any positive whole number consistent with the set of mobile transceivers 36. The large dots between the first mobile data profile 126 and the Nth mobile data profile 426 indicate that a set of mobile profiles can be stored within the mobile profile data of the central server 24. In practice, multiple mobile transceivers can be located in Country X (61) and Country Y (63) and multiple corresponding mobile profiles can be stored as mobile profile data 26 in the central server 24. The central server 24 may be located in Country X (61), Country Y (63) or Country X, Y or Z (65) as indicated in FIG. 1.

The mobile transceiver 36 may comprise a cellular device or mobile unit. The mobile transceiver 36 may be located in Country X (63) or Country Y (65) as indicated by the dashed lines around the mobile transceiver 36 in FIG. 1. The mobile transceiver 36 comprises a mobile unit controller 324 that may store one or more mobile settings, or feature information for operation of the mobile transceiver 36 in accordance with the mobile data profile 26, or a portion thereof.

The first wireless system 101 or the second wireless system 201, or portions thereof, can transmit a mobile station data message 53 (e.g., Location Area Code (LAC), Cell Global Identity (CGI), or other country information). For example, in the first wireless system 101 or second wireless system 201, each base station (10 or 110 in FIG. 2) may regularly transmit the LAC to mobile transceivers 36 within its coverage area. The mobile station data message 53 has location data, a country code or other geographic data on the location of the mobile transceiver 36.

The first wireless system 101 or the second wireless system 201, or portions thereof, may transmit a Temporary Mobile Subscriber Identity (TMSI) or an International Mobile Subscriber Identity (IMSI). The TMSI may be generated in conjunction with the mobile transceiver 36 accessing (e.g., registering, requesting access or initializing on) the wireless system, changing locations (e.g., switching from one Visitor Location Register (VLR) or Mobile Switching Center (MSC) to another), or requesting a location update. The TMSI is proprietary to the network carrier or service provider and may or may not contain an observed country code or other current, dynamically updated location data (e.g., VLR identification data or VLR location data) that pertains to the mobile transceiver 36. The IMSI is seldom used, except for paging of the mobile transceiver 36 prior to assignment of the TMSI, for instance.

The mobile transceiver 36 can transmit an inquiry data message 51 from the mobile transceiver 36 via the air interface to the first wireless system 101 or the second wireless system 201. In turn, the first wireless system 101 or the second wireless system 201 transmits or forwards the inquiry data message 51 to the central server 24. In response to the inquiry data message 51, central server 24 transmits or sends a mobile data profile 26, or a portion thereof, to the first wireless system 101 or the second wireless system 201. In turn, the first wireless system 101 or the second wireless system 201 transmits or forwards the response mobile profile 26 or feature information (226, 326) to the corresponding mobile transceiver 36. The inquiry data message 51 promotes efficient use of the network resources (e.g., capacity, bandwidth, channels, throughput, and the frequency which data message are transmitted) of the first wireless system 101, the second wireless system 201, and the communications network 32 (e.g., Internet).

As illustrated in the example of FIG. 1, the first wireless communication system 101 is located in Country X (61) and the second wireless communication system 201 is located in Country Y (63). The first wireless communication system 101, the second wireless communication system 302, or both can communicate with the central server 24. Data communications between the central server 24 and the first wireless network 101 are supported via a first communications path 55, which may comprise any of the following: a dedicated transmission line, a wireless link, a microwave link, a circuit switched network, or a packet-switched network, or any other suitable communications path. Data communications between the central server 24 and the second wireless network 201 are supported via a second communications path 57, which may comprise any of the following: a dedicated transmission line, a wireless link, a microwave link, a circuit switched network, or a packet-switched network, or any other suitable communications path.

Figure 3:
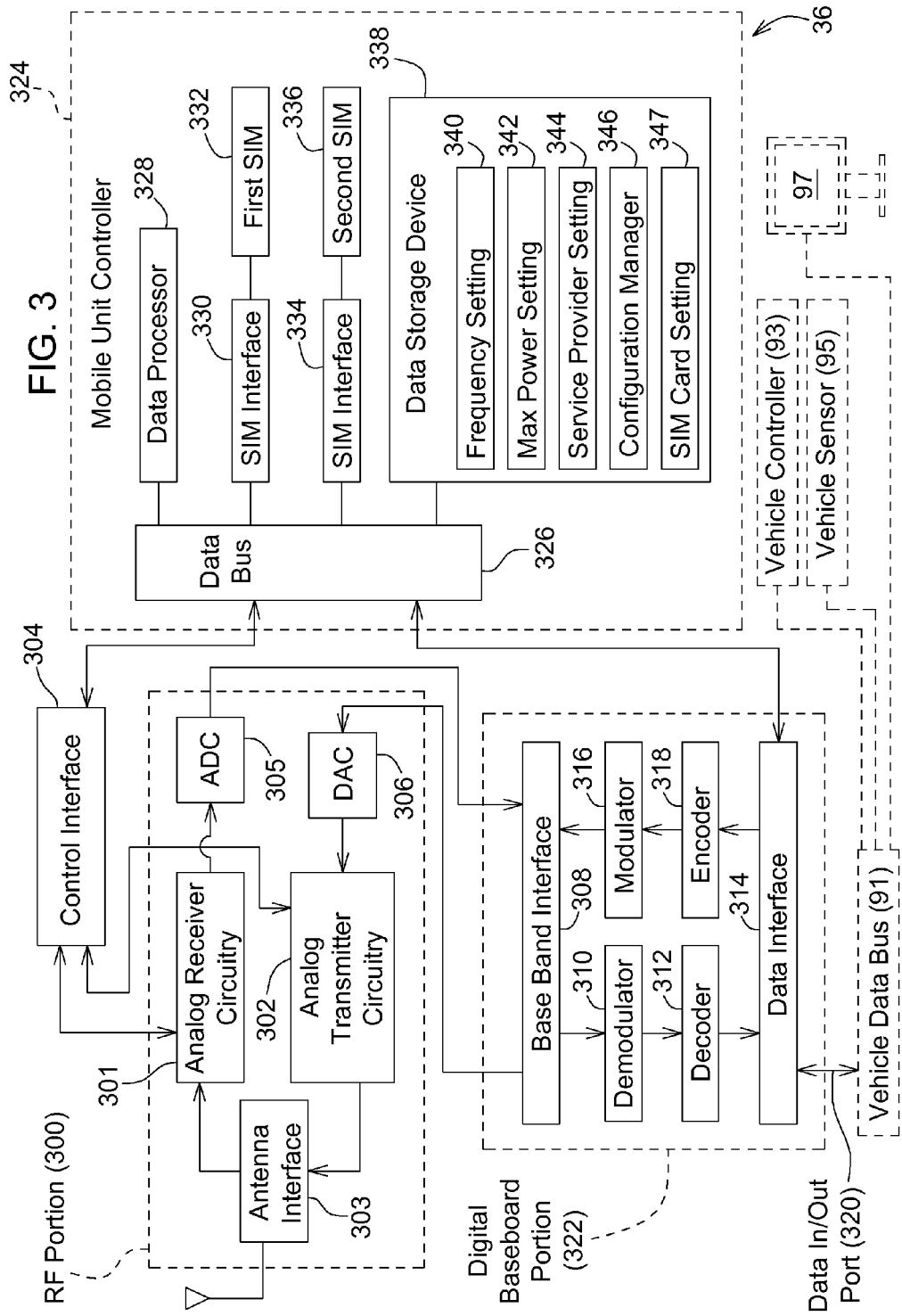
FIG. 3 is a block diagram of an embodiment of a mobile transceiver of the system for controlling wireless access or authorized features a mobile transceiver, where the mobile transceiver is shown in greater detail than in FIG. 1 or FIG. 2.

If the mobile transceiver 36 is located within the first coverage area of the first wireless system 101 or within Country X (61), the mobile transceiver 36 may have a first set of authorized features (e.g., first feature information 226) stored in the data storage device 338 (FIG. 3). However, if the mobile transceiver 36 is located within the second coverage area of the second wireless system 201 or within Country Y (63), the mobile transceiver 36 may have a second set of authorized features (e.g., second feature information 326) stored in the data storage device 338. As illustrated in FIG. 1, the first mobile profile data 126 has first feature information 226 (e.g., primary country-specific profile data) on Feature A and Feature B for the mobile transceiver 36. Although the first feature information 226 (e.g., primary country-specific profile data) for Country X (61) is indicated in a first row of the first mobile profile data 126, any data representation format or structure may be used for the mobile profile data (e.g., 126, 426). Similarly, the mobile profile data 126 has second feature information 326 (e.g., secondary country-specific profile data) for country Y (63) on Feature A and Feature B for the mobile transceiver 36. Although the second feature information 326 is indicated in a second row of the first mobile profile data 126, any data representation format or structure may be used for the mobile profile data (126, 426).

Here in the illustrative example of the first mobile profile data 126 of FIG. 1, feature A relates to whether or not a second SIM 336 (e.g., additional SIM card) is required for the mobile transceiver 36 to operate in Country X (61) or Country Y (63). A first logic level (e.g., logic level 1) may indicate that a second SIM 336 is required for the mobile transceiver 36 to operate in Country X (61), whereas a second logic level (e.g., logic level 0), distinct from the first logic level, may indicate that a second SIM 336 is not required for the mobile transceiver 36 to operate in Country Y (63). Here in the illustrative example of FIG. 1, Feature B relates to a first maximum power level setting (e.g., 10) for Country X (61), and a second maximum power level setting (e.g., 20) for Country Y (63), where each maximum power level setting pertains to a maximum permitted transmitter power level of the mobile transceiver 36.

Figure 2:
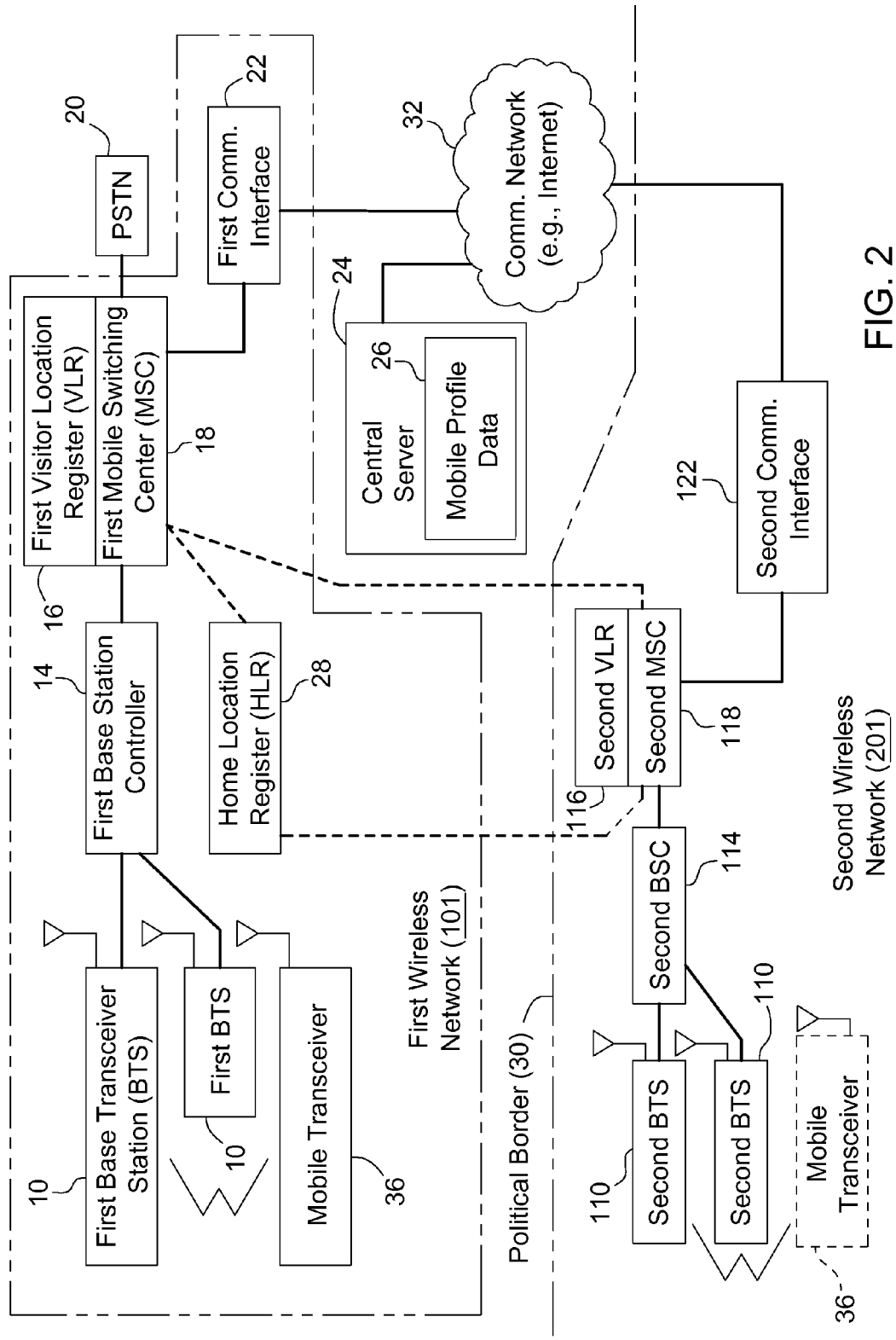
FIG. 2 is a block diagram a system for controlling wireless access or authorized features of a mobile transceiver, where

FIG. 2 illustrates one embodiment of a first wireless system 101, a second wireless system 201 and a central server 24. FIG. 2 represents one possible implementation of the system or configuration of FIG. 1. Other implementations or system configurations fall within the scope of this disclosure. Like elements in FIG. 1 and FIG. 2 are indicated by like reference numbers.

In accordance with one embodiment, FIG. 2 illustrates a block diagram of a system for controlling wireless access to one or more wireless networks (101, 201) or authorized features of a mobile transceiver 36 on one or more wireless networks (101, 201). The system comprises two wireless networks, namely, a first wireless network 101 and a second wireless network 201. In one embodiment, the first wireless network 101 comprises a visited wireless network, whereas the second wireless network 201 comprises a home wireless network or a motherland wireless network. As illustrated, the first wireless network 101 and the second wireless network 201 are separated by a political border 30, such as the border between states, countries, territories, geographic areas or jurisdictions.

In FIG. 2, the first wireless network 101 comprises one or more first base transceiver stations (BTS's) 10 that communicate with a first base station controller 14. In turn, the first base station controller (BSC) 14 is coupled to a first mobile switching center (MSC) 18. A first visitor location register (VLR) 16 may be associated with the first mobile switching center 18. The first mobile switching center 18 is typically coupled to a public switched telephone network 20, although if the first mobile switching center 18 comprises a packet switching node, the packed-switched, first mobile switching center 18 may be coupled to a data packet network, such as the Internet. As shown the first mobile switching center 18 is associated with a first communications interface 22 for accessing a communications network 32, such as the Internet. The home location register 28 (HLR) can communicate with the first mobile switching center 18 of the first wireless network 101 or a second mobile switching center (MSC) 118 of the second wireless network 201. Similarly, the first mobile switching center 18, the second mobile switching center 118, or both, can communicate with the home location register 28. The first mobile switching center 18 and the second mobile switching center 118 support communications and the routing of data messages between the home location register 28 and the first visitor location register 16, between the home location register 28 and the second visitor location register 116, or both between the first visitor location register 16 and the second visitor location register 116.

In FIG. 2, the second wireless network 201 comprises one or more second base transceiver stations 10 that communicate with a second base station controller 114. In turn, the second base station controller 114 is coupled to a second mobile switching center 118. A second visitor location register 116 may be associated with the second mobile switching center 118. The second mobile switching center 118 may be coupled to a public switched telephone network 20 (not shown), although if the second mobile switching center 118 comprises a packet switching node, the packed-switched, second mobile switching center 118 may be coupled to a data packet network, such as the Internet. As shown the second mobile switching center 118 is associated with a second communications interface 122 for accessing a communications network 32, such as the Internet. The home location register 28 can communicate with the first mobile switching center 18, the first wireless network 101 or a second mobile switching center 118 of the second wireless network 201.

The mobile transceiver 36 may be located within the radio frequency or microwave coverage area of the first base transceiver station 10 of the first wireless network 101 or within the radio frequency or microwave coverage area of the second base transceiver station 110 of the second wireless network 201. In the second wireless network 201, the mobile transceiver 36 is shown in dashed lines to indicate that it may be moved to or from the coverage area of the second wireless network 201. In practice, multiple transceivers 36 may be using the first wireless network 101 and the second wireless network 201.

Although a central server 24 is shown above the political border 30 on a side of the first wireless network 101, in one embodiment the central server 24 is not part of the first wireless network 101 or the second wireless network 201. Further, the central server 24 is distinct from the visitor location register (16, 116) and the home location register 28. The central server 24 is capable of communicating with the mobile transceiver 36 via the communications network 32 of FIG. 2 via a communications path between the mobile transceiver 36 and the communications network 32. In one example, if the mobile transceiver 36 is operating within the first wireless network 101, the communications path may comprise a wireless communication or air interface between the mobile transceiver 36 and the first base transceiver station 10, communication between the first base transceiver station 10 and the first base station controller 14, communication between the first base station controller 14 and the first mobile switching center 18, communication between the first mobile switching center 18 and the first communications interface 22, and communication between the first communications interface 22 and the first communications network 32. In another example, if the mobile transceiver 36 is operating within the second wireless network 201, the communications path may comprise a wireless communication or air interface between the mobile transceiver 36 and the second base transceiver station 110, communication between the second base transceiver station 110 and the second base station controller 114, communication between the second base station controller 114 and the second mobile switching center 118, communication between the second mobile switching center 118 and the second communication interfaces 122, and communication between the second communications interface 122 and the communications network 32.

Although the central server 24 may be controlled, leased or owned by the service provider, or subsidiary or affiliate of the service provider, that controls the first wireless network 101 or the second wireless network 201, an independent service provider or separate service provider may control, lease, own or operate the central server 24. For example, the independent service provider may provide one or more vehicle services for a vehicle owner or operator of a vehicle or a fleet of vehicles, particularly where the vehicles may be located in various jurisdictions throughout the world. A vehicle may comprise transportation equipment, trains, mass transit equipment, aircraft, watercraft, ground vehicles, heavy equipment, agricultural equipment, construction equipment, forestry equipment, mowing equipment, lawn care or turf care equipment, or other work vehicles, implements or equipment. In one configuration, the vehicle services, provided by the central server 24 (and the independent service provider) may include one or more of the following: providing machine diagnostic information, diagnostic trouble codes, predictive maintenance data, programming of control modules, updating, maintenance or downloading of vehicle software.

Although the first wireless network 101, the second wireless network 201, and the mobile transceiver 36 of FIG. 2 are described generally in the context of a Global System for Mobile Communications (GSM) wireless system or a Time-Division, Multiple-Access (TDMA) wireless system, the same concepts can be extended to a Code-Division, Multiple-Access communications system (CDMA), or other types of wireless communication systems. The HLR 28 can be located within the first wireless network 101 or the second wireless network 201, or elsewhere.

FIG. 3 provides a block diagram of the mobile transceiver 36. The mobile transceiver 36 comprises a radio frequency (RF) portion 300, a digital baseband portion 322 and a mobile unit controller 324. The RF portion 300 comprises an antenna that is coupled to an antenna interface 303. Analog receiver circuitry 301 receives a radio frequency signal via the antenna interface 303 and antenna from a base transceiver station (10, 110), whereas the analog transmitter circuitry 302 transmits a radio frequency signal over the antenna to a base transceiver station (10, 110). An output of analog receiver circuitry 301 is coupled to an analog-to-digital converter 305 (ADC 305). An input of the analog transmitter circuitry 302 is coupled to an output of a digital-to-analog converter (DAC 306). The antenna interface 202 comprises a diplexer, a duplexer, combiner or an antenna switch, for example. The analog receiver circuitry 301 comprises a downconverter or mixer for down-converting the received signal to baseband or an intermediate frequency for processing by the digital baseband portion 322.

An output of the analog-to-digital converter (ADC) 305 is coupled to the baseband interface 308 of the digital baseband portion 322. Meanwhile, an input of the DAC 306 is coupled to the baseband interface 308 portion. The digital baseband portion 322 comprises a baseband interface 308. The baseband interface 308 receives encoded data via a first processing path and the baseband interface 308 transmits data via a second processing path. The first processing path begins with the input of data to the input/output port of the data interface 314. The first output path of the digital baseband portion 322 comprises a demodulator 310 and a decoder 312. The demodulator 310 is coupled to the baseband interface 308, where the demodulator 310 provides demodulated data to the decoder 312 and where the decoder 312 provides decoded data to the data interface 314. The second output path of the digital baseband portion 322 comprises an encoder 318 and a modulator 316. The encoder 318 is coupled to the data interface 314, where the encoder 318 provides encoded data to the modulator 316 and where the modulator 316 provides modulated data to the baseband interface 308.

For example, the data input output/port 320 may be coupled to a vehicle data bus 91 of a vehicle for processing by the digital baseband portion 322. In turn, a vehicle controller 93, a vehicle sensor 95, and a display 97 are coupled to the vehicle data bus 91. The vehicle controller 93, vehicle sensor 95 and the display 97 are shown in dashed lines because they are optional. In one example, the display 97 may be used to display 97 data messages to a user or operator of the vehicle or the mobile transceiver 36 to alert the user of a need to insert or register a second SIM 336 (e.g., additional SIM) for operation in a certain country where the mobile transceiver 36 is located.

The mobile unit controller 324 comprises a mobile data bus 326 that supports communications between the mobile data bus 326 and the control interface 304 and communications between the mobile data bus 326 and the data interface 314. The mobile unit controller 324 comprises a data processor 328, a first SIM (subscriber identity module) interface 330, a second SIM interface 334, a first SIM 332, a second SIM 336, and a data storage device 338. The data processor 328, the first SIM interface 330, the second SIM interface 334 and the data storage device 338 are coupled to the mobile data bus 326 to facilitate or support communications between or among the above components of the mobile unit controller 324.

In one embodiment, a first SIM 332 may be an integral chip installed in the mobile receiver, whereas the second SIM 336 may be an optional or removal SIM card that can be installed or uninstalled by the operator of the mobile transceiver 36. The first SIM 332 may be authorized for to operate on a visited network (e.g., in foreign country) as a guest for a maximum or limited time, after which the carrier or service provider of the visited network may disable access of the visiting or roaming mobile transceiver 36 (e.g., with the first SIM 332) with or without warning. To operate on the visited network, the customer may obtain, authenticate or register a SIM card that is authorized by or compatible with the carrier of the visited network. Once the second SIM 336 card is registered manually or electronically via temporary or restricted, authorized communications via the first SIM 332 over the visited network, the first SIM 332 card may be disabled or inactive, except for emergencies (e.g., emergency call to police, fire or public safety, such as a 911 call in the U.S.), limited or restricted operation on the visited network. The restricted operation may comprise a limited active mode or pseudo-standby mode that is only active for country of service registration or emergency service. As later described in the method of FIG. 7, the data processor 328 or controller may generate a data message or warning for the user of the mobile transceiver 36 that can appear on the display 97 of the vehicle via the vehicle data bus 91 (e.g., Controller Area Network CAN bus or Ethernet bus) from the mobile transceiver 36.

Each SIM (332, 336) is capable of storing the IMSI and TMSI along with other user settings of the mobile transceiver 36. A first SIM 332 may be authorized to operate with one or more first carriers and one or more first countries (e.g., U.S. and Argentina), whereas a second SIM 336 may be authorized to operate with one or second carriers and in one or more second countries (e.g., Brazil). The International Mobile Subscriber Identity (IMSI) includes the mobile country code of the mobile transceiver 36. The IMSI is stored on the SIM (332, 336) and does not provide an indication of the current or actual location of the mobile transceiver 36. In certain configurations, the IMSI may include a Mobile Country Code, Mobile Network Code, and a Subscriber Number. The IMSI is stored in a subscriber identity module (SIM) (332, 336) of the mobile transceiver 36 and uniquely identifies the mobile transceiver 36. In the IMSI, the Mobile Country Code and Mobile Network Code are related to the home network of the respective mobile transceiver 36, as opposed to the visited network. In certain configurations, the SIM or second SIM 336 can be registered on-line via a Website, or the mobile transceiver 36 can be configured for access to a wireless network via the SIM (332, 336), by entering in the identification of the network (Access Point Name (APN)) and password, for example. The APN represents a node or interface that supports communication between a wireless network and the Internet.

The TMSI is assigned by the wireless network or by the VLR (16, 116) to the mobile transceiver 36 and is transmitted to the mobile transceiver 36 upon registration and to prevent unwanted interception of the IMSI by a criminal or malicious hacker. The TMSI allows the subscriber to be uniquely identified as a substitute for the IMSI. The TMSI is valid for a corresponding VLR (16, 116) and is reassigned if the mobile transceiver 36 moves to a new VLR (16, 116). The TMSI can be stored in the SIM (332, 336) of the mobile transceiver 36 for comparison to the next received TMSI. The TMSI can be uniquely generated or proprietary to the network operator of the VLR (16, 116).

The data storage device 338 is capable of storing, retrieving and accessing one or more of the following items: frequency setting 340, maximum power setting 342, service provider setting 344, configuration manager 346, and SIM card setting 347, among other possible settings and features.

A control interface 305 provides an interface between the RF portion 300 and the mobile unit controller 324. In one embodiment, the contral interface is coupled to the analog receiver circuitry 301, the analog transmitter circuitry 302, and the data bus 326 of the mobile unit controller 324. The control interface 305 may need to send a control signal or control data to control or implement the features or settings authorized or configured by the mobile unit controller 324 for a particular corresponding mobile transceiver 36.

In an alternate embodiment, in response to the inquiry, the mobile transceiver 36 may receive (e.g., from the central server 24 via the visited wireless network) an authorized service provider, country or mobile transceiver setting, or an authorized feature for a second subscriber identity module 336 and the mobile transceiver 36. Further, the mobile transceiver 36 may register or access the visited wireless network via the second subscriber identity module 336.

Figure 4:
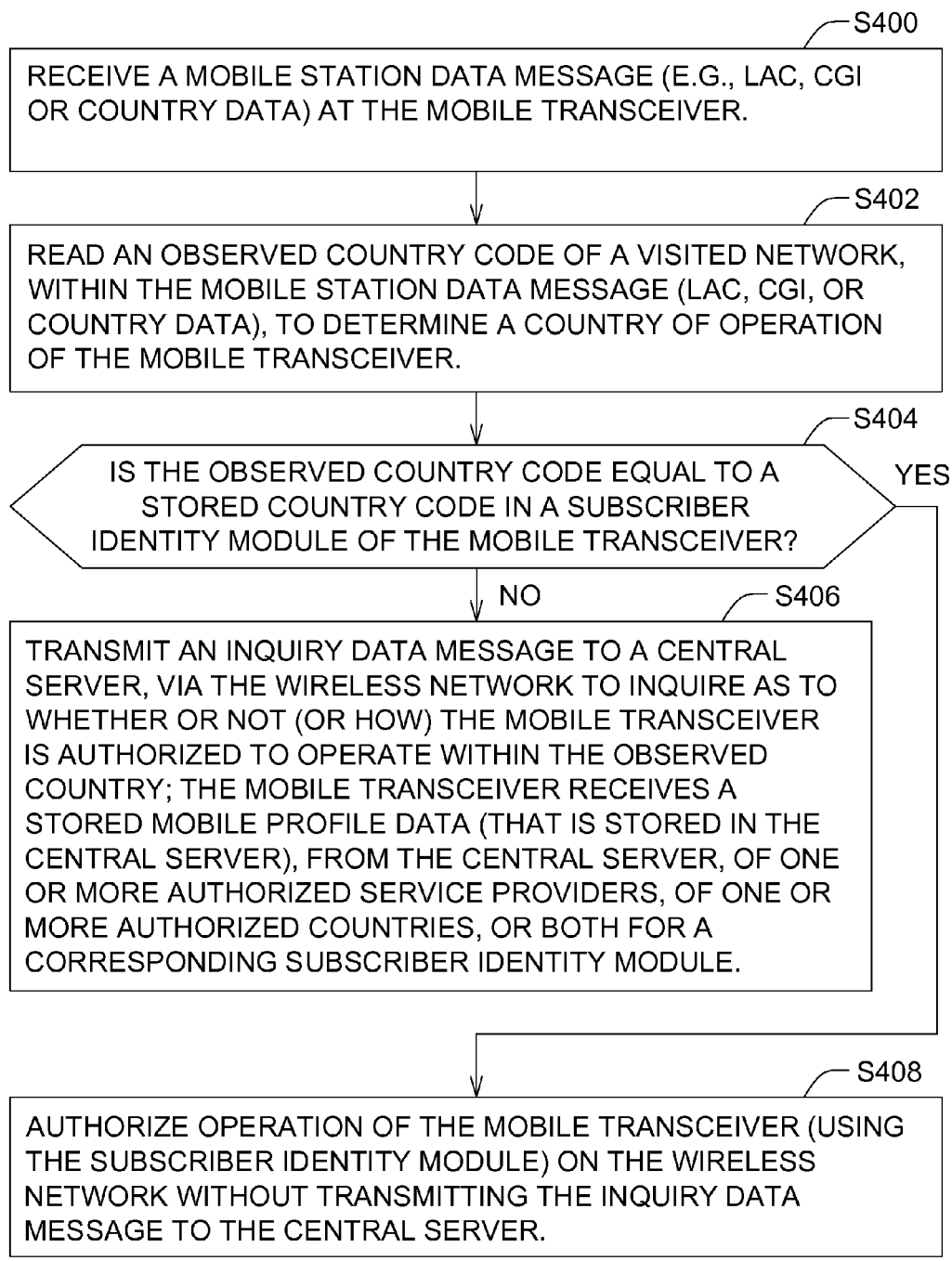
FIG. 4 is a flow chart of a first example of a method for controlling wireless access or authorized features of a mobile transceiver.

FIG. 4 discloses a method of controlling access of a mobile transceiver 36 to a wireless network in accordance with any of the system or mobile transceiver 36 configurations set forth in FIG. 1 through FIG. 3, inclusive, among other possibilities. The method of FIG. 4 begins in step S400.

In step S400, a mobile transceiver 36 or receiver receives a mobile station data message 53 at the mobile transceiver 36. For example, a mobile transceiver 36 or receiver receives a Location Area Identification (LAC), Cell Global Identity (CGI), mobile location data message, location update message, or another mobile station data message 53 that contains embedded location data (on the observed location of the mobile transceiver 36 within a wireless system) (101, 201) for a corresponding mobile transceiver 36. For example, the mobile transceiver 36 receives or detects the Location Area Code (LAC) or Cell Global Identity (CGI) of any wireless cell or BTS (10, 110) that it is assigned to. In the first wireless system 101 or the second wireless system 201, or both, each base station (BTS)(10, 110) may transmit the LAC, a CGI, the mobile station data message or other location data at regular intervals for reception by any mobile transceivers 36 that are assigned to one or more channels, or within the coverage area, of the base station (10, 110). After receiving the LAC, CGI, mobile station data message or other location data, the mobile transceiver 36 may send a current location update or mobile station data message with its current location to the VLR (16, 116), or MSC (18, 118), which can forward the location data to the HLR 28. Here, the mobile transceiver 36 sends the current location update (e.g., or at least a country code, which often remains fairly constant) or mobile station data message to the central server 24 for processing. However, if the current location of the mobile transceiver 36 is unknown or if the mobile transceiver 36 has moved from one cell (e.g., BTS coverage area) to another, the mobile transceiver 36 may send a mobile location update request that contains the previous LAC or CGI, or location of the cell, along with the previously assigned TMSI for the mobile transceiver 36.

In one configuration, the Location Area Identification comprises an observed Mobile Country Code, a Mobile Network Code and Location Area Code of the mobile transceiver 36 unit. That is, the Location Area Identification provides an observed country of operation, the identity of the wireless network that the mobile transceiver 36 is operating on, and the observed location area of the mobile transceiver 36, where the codes or Location Area Code can be sent by the mobile transceiver 36 to the central server 24 for interpretation. The central server 24 can have a database, file, table, or records of corresponding Location Area Codes, or its components, and its or their physical assignments or meanings in the real world. The LAC, or portions thereof, can be stored as fields within the mobile profile data 26. The Cell Global Identity includes an observed Location Area Identification plus an observed Cell Identity of the respective mobile transceiver 36. The CGI, or portions thereof, can be stored as fields within the mobile profile data 26. The Location Area Identification, Cell Identity or other location data on the corresponding mobile transceiver 36 are stored an updated in the VLR (16, 116), the HLR (28), or both, which typically reside in one or more MSC's (18, 118).

In step S402, the mobile transceiver 36, a data processor 328 or mobile unit controller 324 reads an observed country code of a visited network, within the mobile station data message 53 (e.g., LAC, CGI or other country data or location data), to determine a country of operation of the mobile transceiver 36.

In step S404, a data processor 328 or mobile unit controller 324 determines if the observed country code is equal to a stored country code in a subscriber identity module of the mobile transceiver 36. If the observed country code is equal to the stored country code, the method continues with step S408. However, if the observed country code is not equal to (or differs from) the stored country code, the method continues with step S406.

Step S404, may be executed in accordance with various techniques that may be applied alternately or cumulatively. Under a first technique, the data processor 328 or mobile unit controller 324 determines if the observed country code is equal to a stored country code upon the Nth initialization of the mobile subscriber, where N is any whole number greater or equal to 1. Under a second technique, the data processor 328 or mobile unit controller 324 determines if the observed country code is equal to a stored country code regularly (e.g., periodically) upon the expiration of an interval.

In step S406, if the observed country code differs from the stored country code, the data processor 328 or mobile unit controller 324 transmits an inquiry data message 51 to a central server 24, via the wireless network (101, 201) to inquire as to whether or not the mobile transceiver 36 is authorized to operate within the observed country; the data processor 328 or mobile unit controller 324 receives feature information or a stored mobile profile data (that is stored in the central server 24), from the central server 24, of one or more authorized service providers or countries for a corresponding subscriber identity module. The central server 24 may store a database, file, records or tables of country authorizations and corresponding SIM identifiers or mobile transceiver identifiers. The country authorizations and corresponding SIM identifiers may be expressed as rules. Mobile profile data 26, or portions thereof, stored at the central server 24 is delivered or sent to the mobile transceiver 36 upon its request in response to an inquiry data message 51. The inquiry data message 51 minimizes or efficiently uses the bandwidth or communications channel between the mobile transceiver 36 and the central server 24 because its transmission is only triggered where a mismatching location condition (e.g., of the observed country code and the stored country code) of S404 is satisfied.

The central server 24 operates without communicating directly with home location registry (HLR 28) or a visitor location registry (VLR (16, 116)), and wherein the central server 24 is separate and distinct from wireless infrastructure of the wireless network (101, 201). The service provider that offers vehicle diagnostics, predictive maintenance or other vehicle related service communications via the mobile transceiver 36 (and central server 24) can configure mobile transceivers 36 in accordance with regulations or location specific requirements of carriers in different countries without read access to the HLR, VLR or other wireless infrastructure of the carrier. The central server 24 receives observed location data from the mobile transceiver 36 can access a stored database, chart, files or records of codes of observed locations and corresponding country-specific or location specific settings or one or more authorized subscriber identity modules for a corresponding observed location of the mobile transceiver 36.

In step S408, if the observed country code equals the stored country code, the data processor 328 or the mobile unit controller 324 authorizes operation of the mobile transceiver 36 using the subscriber identity mobile on the wireless network without transmitting the inquiry data message 51 to the central server 24.

Figure 5B:
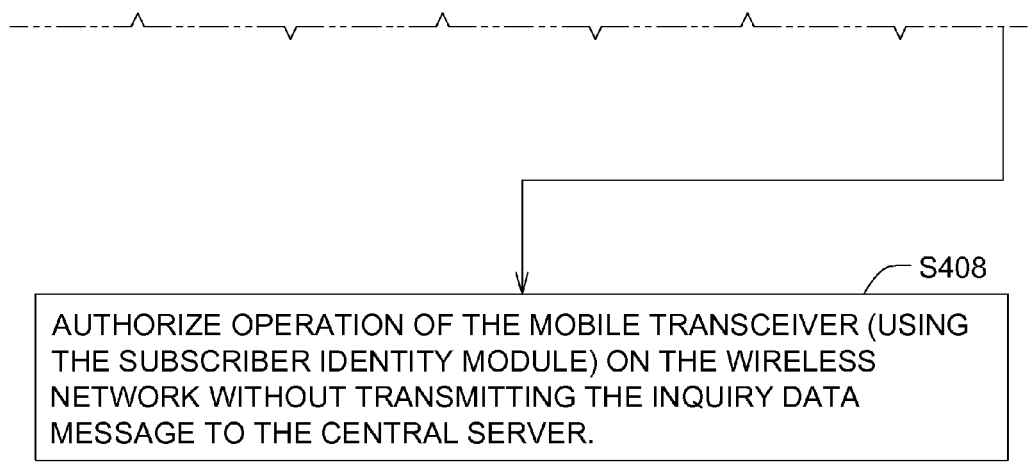
FIG. 5 (FIG. 5A and FIG. 5B collectively) is a flow chart of a second example of a method for controlling wireless access or authorized features of a mobile transceiver.

The method of FIG. 5 (FIG. 5A and FIG. 5B, collectively) is similar to the method of FIG. 4, except the method of FIG. further comprises step S409. Like reference numbers in FIG. 4 and FIG. 5 indicate like steps or procedures.

Step S409 may be executed after step S406. In an alternate example, step S409 may be executed after S408 where the mobile transceiver 36 contains current or valid mobile profile data that was previously received by the mobile transceiver 36 from the central server 24.

In step S409, the data processor 328 or mobile unit controller 324 configures at least one authorized feature of the mobile transceiver 36 in accordance with the mobile profile data, or a portion thereof, as communicated or received via the wireless network from the central server 24. In one configuration, the mobile profile data comprises data for compliance with regulations or pre-defined or country or location specific settings to allow a first subscriber identity module (SIM), a second subscriber identity module (e.g., an additional SIM), or both to be active or inactive within the determined country or location of operation, or settings to allow or restrict the subscriber identity module or first subscriber identity module to a restricted active state. In the restricted active state, the data processor 328 or mobile unit controller 324 may restrict mobile-generated calls (e.g., mobile-generated data messages of end user originating data content for the central server 24), mobile-terminated calls (e.g., mobile-terminated data messages of end user originating data content for the central server 24), or both via the subscriber identity module in the observed country to limit operation of the mobile transceiver 36 or to establish the registration of a secondary subscriber module for the observed country code.

Step S409 may be executed in accordance with various techniques that may be applied separately or cumulatively. In accordance with a first technique for executing step S409, the data processor 328 or mobile unit controller 324 configures at least one authorized feature of the mobile transceiver 36 in accordance with the mobile profile data, or a portion thereof, as communicated via the wireless network from the central server 24.

In accordance with a second technique, the data processor 328 or mobile unit controller 324 configures at least one authorized feature of the mobile transceiver 36 in accordance with the mobile profile data, or a portion thereof, as communicated via the wireless network from the central server 24 to comply with regulations or pre-defined country or location specific-settings to allow the subscriber identity module (e.g., first SIM), a second subscriber identity module, or both to be active or inactive within the determined country or location of operation.

In accordance with a third technique, the data processor 328 or mobile unit controller 324 configures at least one authorized feature of the mobile transceiver 36 in accordance with the mobile profile data, or a portion thereof, as communicated via the wireless network from the central server 24 to comply with regulations or pre-defined country or location specific-settings wherein the first subscriber identity module has a restricted active state, the restrictive active state allowing communications over the wireless network for the purpose of registration or authentication of the first subscriber identity module or a second subscriber identity module, or limiting operation of the mobile transceiver 36 to establishing the registration of a secondary subscriber module for the observed country code. In one embodiment, the restricted mode may allow the receiver of the mobile transceiver 36 to listen or receive channel assignments, for example.

In accordance with a fourth technique, the mobile transceiver 36 receives a data message in response to the inquiry data message 51 that the mobile transceiver 36 is not authorized to operate in the wireless network; the data processor 328 or the mobile unit controller 324 configures the mobile unit controller 324 in accordance with a mobile profile, an unauthorized mobile profile, or otherwise to restrict mobile-generated calls, mobile terminated calls, or both via the subscriber identity module in the observed country to limit operation of the mobile transceiver 36 or to establish the registration or authentication of a second subscriber module for the observed country code.

Figure 6A:
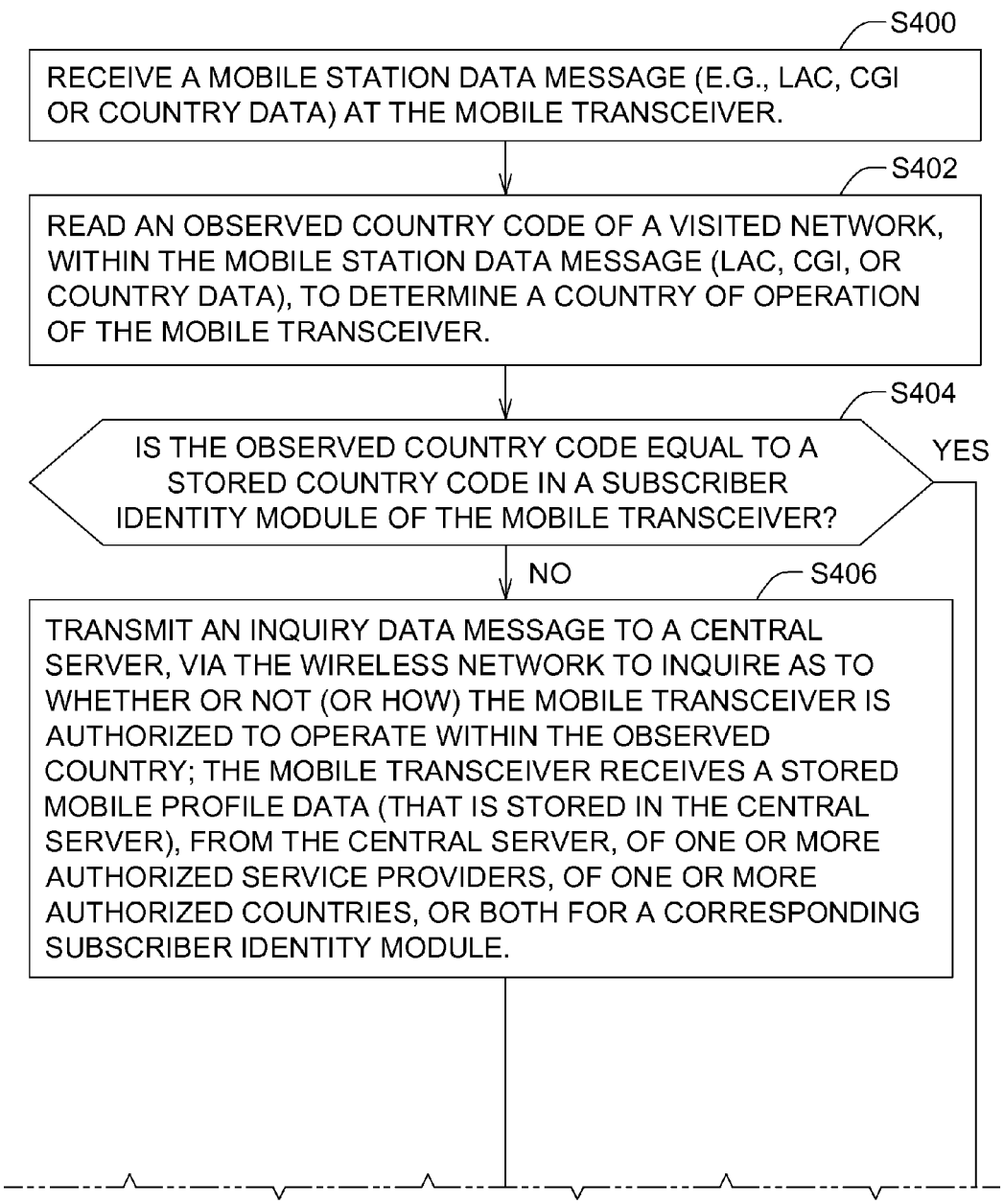
FIG. 6 (FIG. 6A and FIG. 6B collectively) is a flow chart of a third example of a method for controlling wireless access or authorized features of a mobile transceiver.
Figure 6B:
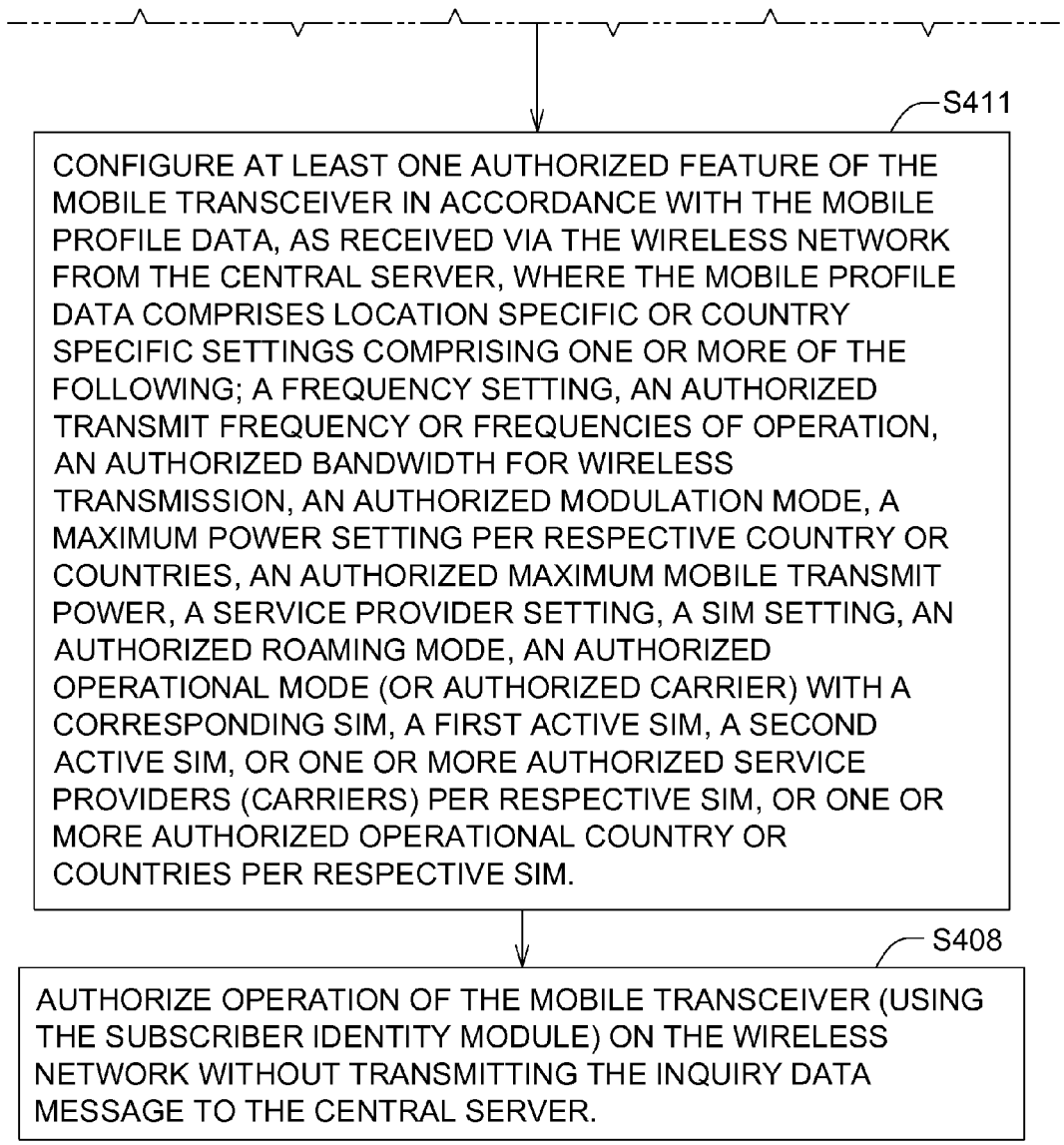

The method of FIG. 6 (FIG. 6A and FIG. 6B, collectively) is similar to the method of FIG. 4, except the method of FIG. 6 further comprises step S411. Like reference numbers in FIG. 4 and FIG. 5 indicate like steps or procedures.

Step S411 may be executed after step S406. In an alternate example, step S409 may be executed after S408 where the mobile transceiver 36 contains current or valid mobile profile data that was previously received from the central server 24.

In step S411, the data processor 328 or mobile unit controller 324 configures at least one authorized feature of the mobile transceiver 36 in accordance with the mobile profile data, or a portion thereof, as communicated or received via the wireless network from the central server 24. In one configuration, the mobile profile data comprises location-specific or country-specific settings of the mobile transceiver 36 as communicated via the wireless network from the central server 24 to comply with regulations or pre-defined or country or location specific settings comprising one or more of the following: a frequency setting 340, authorized transmit frequency or frequencies of operation, authorized receive frequency or frequencies, authorized bandwidth for wireless transmission, authorized modulation mode (e.g., Time-Division, Multiple-Access (TDMA), Global System for Mobile Communications (GSM), Code-Division, Multiple-Access (CDMA) or analog, phase or frequency modulation), a maximum power setting 342, authorized maximum mobile transmit power, a service provider setting 344, a subscriber identity module (SIM) setting (e.g., single SIM or dual SIM authorized per mobile transceiver 36), authorized roaming mode, authorized operational mode (or authorized carrier) with a corresponding subscriber identity module (SIM), a first active subscriber identity module (SIM), a second active subscriber identity module (SIM), or authorized carrier or service provider per respective SIM.

Figure 7B:
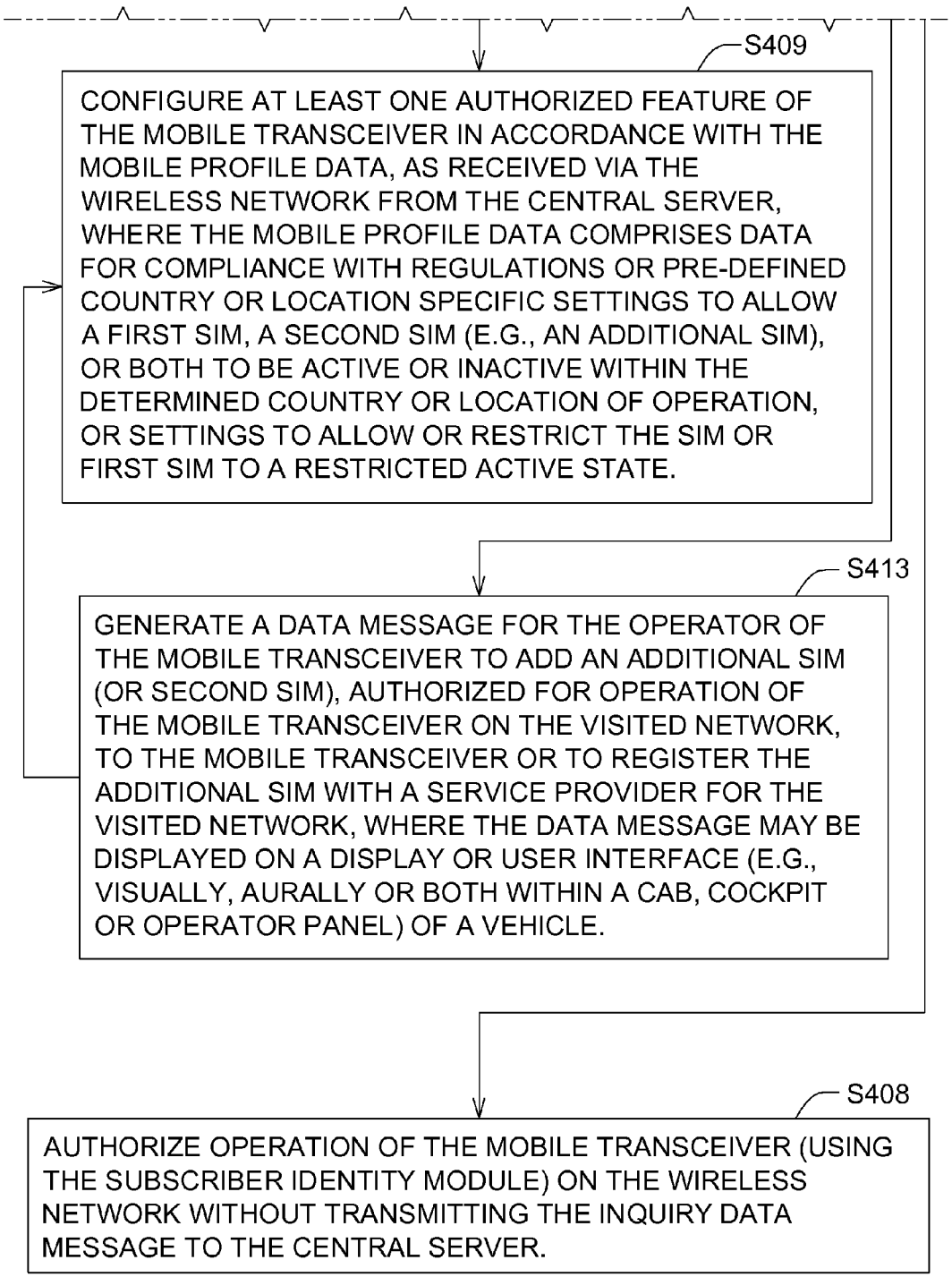
FIG. 7 (FIG. 7A and FIG. 7B collectively) is a flow chart of a fourth example of a method for controlling wireless access or authorized features of a mobile transceiver.

The method of FIG. 7 (FIG. 7A and FIG. 7B, collectively) is similar to the method of FIG. 4, except the method of FIG. 7 further comprises step S427, S409, and S413. Like reference numbers in FIG. 4 and FIG. 7 indicate like steps or procedures.

Step S427 follows step S406. In step S427, the data processor 328 or the mobile unit controller 324 determines whether or not an additional subscriber identity module (SIM) (e.g., second SIM 336) is required to configure or operate the mobile transceiver. For example, the data processor 328 or mobile unit controller 324 may obtain profile data, or a portion thereof (e.g., SIM card setting or authorization by country), from the central server 24, the data storage device 338 or both. If an additional SIM is not required, the method continues with step S409. However, if an additional SIM is required, the method continues with step S413. In step S409, the data processor 328 or mobile unit controller 324 configures at least one authorized feature of the mobile transceiver 36 in accordance with the mobile profile data, or a portion thereof, as communicated or received via the wireless network from the central server 24. In one configuration, the mobile profile data comprises data for compliance with regulations or pre-defined or country or location specific settings to allow a first subscriber identity module (SIM), a second subscriber identity module (e.g., an additional SIM), or both to be active or inactive within the determined country or location of operation, or settings to allow or restrict the subscriber identity module or first subscriber identity module to a restricted active state. In the restricted active state, the data processor 328 or mobile unit controller 324 may restrict mobile-generated calls (e.g., mobile-generated data messages of end user originating data content for the central server 24), mobile-terminated calls (e.g., mobile-terminated data messages of end user originating data content for the central server 24), or both via the subscriber identity module in the observed country to limit operation of the mobile transceiver 36 or to establish the registration of a secondary subscriber module for the observed country code.

Step S409 may be executed in accordance with various techniques that may be applied separately or cumulatively. In accordance with a first technique for executing step S409, the data processor 328 or mobile unit controller 324 configures at least one authorized feature of the mobile transceiver 36 in accordance with the mobile profile data, or a portion thereof, as communicated via the wireless network from the central server 24.

In accordance with a second technique, the data processor 328 or mobile unit controller 324 configures at least one authorized feature of the mobile transceiver 36 in accordance with the mobile profile data, or a portion thereof, as communicated via the wireless network from the central server 24 to comply with regulations or pre-defined country or location specific-settings to allow the subscriber identity module (e.g., first SIM), a second subscriber identity module, or both to be active or inactive within the determined country or location of operation.

In accordance with a third technique, the data processor 328 or mobile unit controller 324 configures at least one authorized feature of the mobile transceiver 36 in accordance with the mobile profile data, or a portion thereof, as communicated via the wireless network from the central server 24 to comply with regulations or pre-defined country or location specific-settings wherein the first subscriber identity module has a restricted active state, the restrictive active state allowing communications over the wireless network for the purpose of registration or authentication of the first subscriber identity module or a second subscriber identity module, or limiting operation of the mobile transceiver 36 to establishing the registration of a secondary subscriber module for the observed country code. In one embodiment, the restricted mode may allow the receiver of the mobile transceiver 36 to listen or receive channel assignments, for example.

In accordance with a fourth technique, the mobile transceiver 36 receives a data message in response to the inquiry data message 51 that the mobile transceiver 36 is not authorized to operate in the wireless network; the data processor 328 or the mobile unit controller 324 configures the mobile unit controller 324 in accordance with a mobile profile, an unauthorized mobile profile, or otherwise to restrict mobile-generated calls, mobile terminated calls, or both via the subscriber identity module in the observed country to limit operation of the mobile transceiver 36 or to establish the registration or authentication of a second subscriber module for the observed country code.

In step S413, the data processor 328 or mobile controller unit generates a data message for the operator or subscriber to add an additional subscriber identity module (e.g., second SIM 336) authorized for operation of the mobile transceiver 36 on the visited network to the mobile transceiver 36 or to register the additional subscriber identity module (e.g., second SIM 336) with a service provider for the visited network. The foregoing data message may be displayed on a display 97 or user interface (e.g., visually, aurally, or both within a cab, cockpit or operator panel) of a vehicle.

Step S408 can follow S404 and was previously described in conjunction with FIG. 4. The description of S408 in conjunction with FIG. 4 applies equally to the method of FIG. 7 as if fully set forth in this document.

Figure 8:
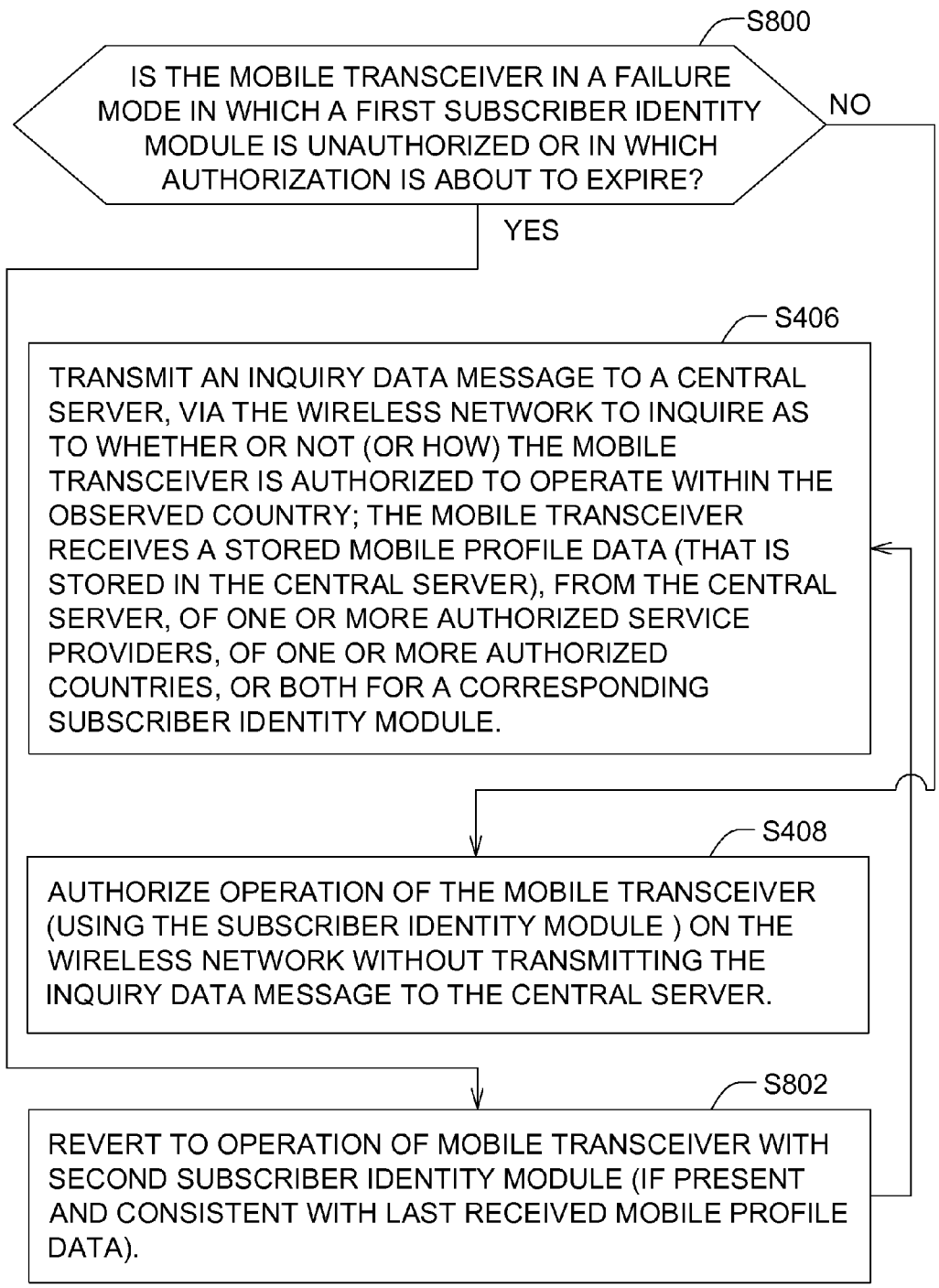
FIG. 8 is a flow chart of a fifth example of a method for controlling wireless access or authorized features of a mobile transceiver.

The method of FIG. 8 is similar to the method of FIG. 4, except the method of FIG. 8 replaces steps S400, S402, and S404 with S800 and S802. Like reference numbers in FIG. 4 and FIG. 8 indicate like numbers.

In step S800, is the mobile transceiver 36 in or entering a failure mode in which the mobile transceiver 36 with the first SIM 332 is unauthorized or in which the authorization of the first SIM 332 is about to expire? If the mobile transceiver 36 is in or imminently entering failure mode or imminently expiring, the method continues with step S802. If the mobile transceiver 36 is not in or not imminently entering the failure mode, the method continues with step S408.

In step S800, the possible precursor step to S406, the inquiry data message 51 is not triggered based on the observed country code not equaling or matching the stored country code in the SIM. Instead, in step S800, the inquiry data message 51 may be triggered when the mobile transceiver 36 operating with the first SIM 332 enters into a failure mode, where outgoing communications between the wireless system and the mobile transceiver 36 via the first SIM 332 does not function because the carrier or wireless system changes the status of the mobile transceiver 36 to an unauthorized status, or the carrier, service provider, or wireless system ends a grace period or guest period for the mobile transceiver 36 to operate on the wireless system.

In step S802, if the mobile transceiver 36 is in the failure mode or if the first SIM authorization is about to expire, the mobile transceiver 36, mobile unit controller 324, or data processor 328 may revert to operation of the second SIM 336 card or may need to register a second SIM 336 card or additional SIM to execute step S406. The mobile transceiver 36 may be programmed to register a SIM or additional SIM card by contacting the APN via the wireless network and entering a password for the operator. Alternately, an operator may need to manually register the second SIM 336 or additional SIM card via a web-enabled device that has access to the APN of the wireless network. Step S406 follows step S802.

S406 and S408 were previously described in conjunction with FIG. 4 and the description applies equally here to FIG. 8, as if fully set forth herein.

In certain geographic areas, a mobile transceiver may have limited authorization or no authorization to operate in a roaming mode on the visited network via a first subscriber identity module. The various embodiments of the system and methods of this disclosure are well suited to facilitate a mobile transceiver's efficient transition from a first subscriber identity module to a second subscriber identity module, or to facilitate a mobile transceiver's operation in accordance with applicable authorizations, regulations, or both. The central server is capable of storing, retrieving and managing profile data for subscribers to manage applicable authorizations of corresponding mobile transceivers, where the mobile transceiver is moved from one country or geographic area to another. In one configuration, the profile data can be added to leverage an existing server that provides diagnostic services, vehicle predictive maintenance, software maintenance or upgrading, or other services for vehicle owners or operations, where the mobile transceiver is installed on a vehicle for transmission of vehicle data.

Having described the preferred embodiment, it will become apparent that various modifications can be made without departing from the scope of the invention as defined in the accompanying claims.

The following is claimed:

1. A method of controlling access of a mobile transceiver to a wireless network, the method comprising:
   receiving a mobile station data message at the mobile transceiver;
   within the mobile station data message, reading an observed country code of a visited wireless network to determine a country of operation of the mobile transceiver;
   determining if the observed country code is equal to a stored country code in a subscriber identity module of the mobile transceiver;
   if the observed country code differs from the stored country code, transmitting an inquiry data message to a vehicle-services central server that provides or supports vehicle services comprising diagnostics, via the wireless network and the internet to inquire as to whether or not the mobile transceiver is authorized to operate within the observed country, to receive mobile profile data of one or more authorized service providers or countries for a corresponding subscriber identity module;
   if the observed country code equals the stored country code, authorize operation of the mobile transceiver using the subscriber identity mobile on the wireless network without transmitting the inquiry data message to the central server, wherein the vehicle-services central server operates without communicating with a home location registry (HLR) or a visitor location registry (VLR), and wherein the vehicle-services central server is separate and distinct from wireless infrastructure of the wireless network to allow for programmed registration of the operation of the mobile transceiver in accordance with an authorization or at least one authorized feature when the mobile transceiver is operated near a border with coverage of the visited wireless network and a home wireless network to avoid unauthorized access or guest roaming access to the visited wireless network; and
   authorizing a first subscriber identity module (SIM) of the mobile transceiver to operate on the visited network in a guest roaming mode for a limited time; and
   registering a second SIM of the mobile transceiver via wireless communication of the mobile transceiver during the limited time for authorized operation compatible with the visited network after the limited time or when the first SIM is inactive.

2. The method according to claim 1 wherein the receiving the mobile station data message comprises receiving a Location Area Identification (LAC), Cell Global Identity (CGI), mobile location data message, a location update message, or another mobile station data message that contains embedded location data on the observed location of the mobile transceiver within a wireless system.

3. The method according to claim 1 wherein the determining if the observed country code is equal to a stored country code occurs upon the Nth initialization of the mobile subscriber, where N is any whole number greater or equal to 1.

4. The method according to claim 1 wherein determining if the observed country code is equal to a stored country code occurs upon regularly upon the expiration of an interval.

5. The method according to claim 1 wherein the mobile data profile further comprises one or more of the following: a frequency setting, a maximum power setting, a service provider setting, and a subscriber identity module (SIM) card setting.

6. The method according to claim 1 further comprising:
   generating a data message for the subscriber to add an additional subscriber identity module authorized for operation of the mobile transceiver on the visited network to the mobile transceiver or to register the additional subscriber identity module with a service provider for the visited network.

7. The method according to claim 1 further comprising:
   configuring the at least one authorized feature of the mobile transceiver in accordance with the mobile profile data as communicated via the wireless network from the central server.

8. The method according to claim 1 further comprising:
   configuring the at least one authorized feature of the mobile transceiver in accordance with the mobile profile data as communicated via the wireless network from the central server to comply with regulations or pre-defined country or location specific-settings to allow the subscriber identity module, a second subscriber identity module, or both to be active or inactive within the determined country or location of operation.

9. The method according to claim 1 further comprising:
   configuring the at least one authorized feature of the mobile transceiver in accordance with the mobile profile data as communicated via the wireless network from the central server to comply with regulations or pre-defined country or location specific-settings wherein the first subscriber identity module has a restricted active state, the restrictive active state allowing communications over the wireless network for the purpose of registration or authentication of the first subscriber identity module or a second subscriber identity module, or limiting operation of the mobile transceiver to establishing the registration of a secondary subscriber module for the observed country code.

10. The method according to claim 1 further comprising:
    receiving a data message in response to the inquiry data message that the mobile transceiver is not authorized to operate on the wireless network; and
    for the mobile transceiver, restricting mobile-generated calls, mobile-terminated calls, or both via the subscriber identity module in the observed country to limit operation of the mobile transceiver to establish the registration of a secondary subscriber module for the observed country code.

11. A system for controlling access of a mobile transceiver to a wireless network, the system comprising:

a mobile receiver or transceiver for receiving a mobile station data message;

a data processor adapted:

to read an observed country code of a visited network, within the mobile station data message, to determine a country of operation of the mobile transceiver;

to determine if the observed country code is equal to a stored country code in a subscriber identity module of the mobile transceiver;

if the observed country code differs from the stored country code, to transmit an inquiry data message to a vehicle-services central server that provides or supports vehicle services comprising diagnostics, via the wireless network and the internet to inquire as to whether or not the mobile transceiver is authorized to operate within the observed country, and to receive, from the central server, mobile profile data of one or more authorized service providers or countries for a corresponding subscriber identity module if the observed country code equals the stored country code, to authorize operation of the mobile transceiver using the subscriber identity mobile on the wireless network without transmitting the inquiry data message to the vehicle-services central server, wherein the vehicle-services central server operates without communicating with a home location registry (HLR) or a visitor location registry (VLR), and wherein the vehicle-services central server is separate and distinct from wireless infrastructure of the wireless network to allow for programmed registration of the operation of the mobile transceiver in accordance with an authorization or at least one authorized feature when the mobile transceiver is operated near a border with coverage of the visited wireless network and a home wireless network to avoid unauthorized access or quest roaming access to the visited wireless network;

wherein the mobile transceiver comprises: a first subscriber identity module (SIM) authorized to operate on the visited network in the guest roaming mode for a limited time; and a second SIM registered or activated by the mobile transceiver via wireless communication under the first SIM during the limited time, the second SIM authorized to operate on the visited network after the limited time or when the first SIM is inactive.

12. The system according to claim 11 wherein mobile station data message comprises receiving a Location Area Identification (LAC), Cell Global Identity (CGI), mobile location data message, a location update message, or another mobile station data message that contains embedded location data on the observed location of the mobile transceiver within a wireless system.

13. The system according to claim 11 wherein data processor is adapted to determine if the observed country code is equal to a stored country code occurs upon the Nth initialization of the mobile subscriber, where N is any whole number greater or equal to 1.

14. The system according to claim 11 wherein the data processor is adapted to determine if the observed country code is equal to a stored country code occurs upon regularly upon the expiration of an interval.

15. The system according to claim 11 wherein the mobile data profile further comprises one or more of the following: a frequency setting, a maximum power setting, a service provider setting, and a subscriber identity module (SIM) card setting.

16. The system according to claim 11 wherein the data processor is adapted to generate a data message for the subscriber to add an additional subscriber identity module authorized for operation of the mobile transceiver on the visited network to the mobile transceiver or to register the additional subscriber identity module with a service provider for the visited network.

17. The system according to claim 11 wherein the data processor is adapted to configure the at least one authorized feature of the mobile transceiver in accordance with the mobile profile data as communicated via the wireless network from the central server.

18. The system according to claim 11 wherein the data processor is adapted to configure the at least one authorized feature of the mobile transceiver in accordance with the mobile profile data as communicated via the wireless network from the central server to comply with regulations or pre-defined country or location specific-settings to allow the subscriber identity module, a second subscriber identity module, or both to be active or inactive within the determined country or location of operation.

19. The system according to claim 11 wherein the data processor is adapted to configure the at least one authorized feature of the mobile transceiver in accordance with the mobile profile data as communicated via the wireless network from the central server to comply with regulations or pre-defined country or location specific-settings wherein the first subscriber identity module has a restricted active state, the restrictive active state allowing communications over the wireless network for the purpose of registration or authentication of the first subscriber identity module or a second subscriber identity module, or limiting operation of the mobile transceiver to establishing the registration of a secondary subscriber module for the observed country code.

20. The system according to claim 11 further wherein the mobile receiver or transceiver is adapted to receive a data message in response to the inquiry data message that the mobile transceiver is not authorized to operate on the wireless network; and for the mobile transceiver, the data processor is adapted to restrict mobile-generated calls, mobile-terminated calls, or both via the subscriber identity module in the observed country to limit operation of the mobile transceiver to establish the registration of a secondary subscriber module for the observed country code.

* * * * *